(12) United States Patent
Kipp (10) Patent No.: US 12,443,456 B2
(45) Date of Patent: *Oct. 14, 2025

(54) ORGANIZING TASKS BY A HIERARCHICAL TASK SCHEDULER FOR EXECUTION IN A MULTI-THREADED PROCESSING SYSTEM

(71) Applicant: Oxide Interactive, Inc., Timonium, MD (US)

(72) Inventor: Timothy James Kipp, Fallston, MD (US)

(73) Assignee: Oxide Interactive, Inc., Timonium, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,563

(22) Filed: Sep. 20, 2023

(65) Prior Publication Data

US 2024/0020166 A1   Jan. 18, 2024

Related U.S. Application Data

(63) Continuation of application No. 17/569,275, filed on Jan. 5, 2022, now Pat. No. 11,797,348, which is a continuation of application No. 15/011,127, filed on Jan. 29, 2016, now Pat. No. 11,249,807, which is a continuation of application No. 14/077,899, filed on Nov. 12, 2013, now Pat. No. 9,250,953.

(51) Int. Cl.
*G06F 9/50* (2006.01)
*G06F 9/46* (2006.01)
*G06F 9/48* (2006.01)

(52) U.S. Cl.
CPC .............. *G06F 9/5038* (2013.01); *G06F 9/46* (2013.01); *G06F 9/4881* (2013.01); *G06F 9/50* (2013.01); *G06F 9/5027* (2013.01)

(58) Field of Classification Search
CPC ........ G06F 9/5038; G06F 9/50; G06F 9/5027; G06F 9/4881; G06F 9/46
See application file for complete search history.

(56) References Cited

U.S. PATENT DOCUMENTS

| | | | | |
|---|---|---|---|---|
| 5,752,031 | A | * | 5/1998 | Cutler ....................... G06F 9/52 |
| | | | | 718/107 |
| 6,212,543 | B1 | * | 4/2001 | Futral ................. G06F 13/1642 |
| | | | | 710/29 |
| 6,823,351 | B1 | * | 11/2004 | Flood .................. G06F 12/0276 |
| | | | | 711/E12.012 |

(Continued)

*Primary Examiner* — Benjamin C Wu
(74) *Attorney, Agent, or Firm* — ICE MILLER LLP; Justin D. Swindells (57) ABSTRACT

A method for scheduling tasks from a program executed by a multi-processor core system is disclosed. The method includes a scheduler that groups a plurality of tasks, each having an assigned priority, by priority in a task group. The task group is assembled with other task groups having identical priorities in a task group queue. A hierarchy of task group queues is established based on priority levels of the assigned tasks. Task groups are assigned to one of a plurality of worker threads based on the hierarchy of task group queues. Each of the worker threads is associated with a processor in the multi-processor system. The tasks of the task groups are executed via the worker threads according to the order in the hierarchy.

5 Claims, 5 Drawing Sheets

(56) References Cited

U.S. PATENT DOCUMENTS

| | | | | |
|---|---|---|---|---|
| 8,516,488 | B1* | 8/2013 | Brown | G06F 9/5038 |
| | | | | 707/718 |
| 9,396,039 | B1* | 7/2016 | Arguelles | G06F 9/5083 |
| 11,249,807 | B2* | 2/2022 | Kipp | G06F 9/50 |
| 11,797,348 | B2* | 10/2023 | Kipp | G06F 9/4881 |
| 2003/0058875 | A1* | 3/2003 | Arndt | H04L 49/901 |
| | | | | 370/328 |
| 2010/0251250 | A1* | 9/2010 | Kishan | G06F 9/4843 |
| | | | | 718/103 |
| 2011/0161978 | A1* | 6/2011 | Jang | G06F 9/505 |
| | | | | 718/104 |
| 2012/0159498 | A1* | 6/2012 | Wilmarth | G06F 9/526 |
| | | | | 718/103 |
| 2012/0331238 | A1* | 12/2012 | McKenney | G06F 9/526 |
| | | | | 711/147 |
| 2013/0014118 | A1* | 1/2013 | Jones | G06F 9/544 |
| | | | | 718/104 |
| 2014/0123144 | A1* | 5/2014 | Llamas | G06F 9/546 |
| | | | | 718/101 |
| 2014/0344830 | A1* | 11/2014 | Tipparaju | G06F 9/505 |
| | | | | 718/105 |
| 2015/0089495 | A1* | 3/2015 | Persson | G06F 9/45558 |
| | | | | 718/1 |
| 2017/0132037 | A1* | 5/2017 | Sevigny | G06F 9/4881 |
| 2018/0232259 | A1* | 8/2018 | Chowdhury | G06F 9/4881 |

* cited by examiner

ORGANIZING TASKS BY A HIERARCHICAL TASK SCHEDULER FOR EXECUTION IN A MULTI-THREADED PROCESSING SYSTEM

CROSS-REFERENCE TO RELATED APPLICATIONS

The present application is a continuation of U.S. patent application Ser. No. 17/569,275, filed on Jan. 5, 2022, now allowed, which is a continuation of U.S. patent application Ser. No. 15/011,127, filed on Jan. 29, 2016, now U.S. Pat. No. 11,249,807, which is a continuation of U.S. patent application Ser. No. 14/077,899, filed on Nov. 12, 2013, now U.S. Pat. No. 9,250,953, issued on Feb. 2, 2016, each of which is hereby incorporated by reference herein in its entirety.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to scheduling tasks in a multi-thread system, and more particularly, to a task scheduler that orders program tasks in task groups and task group queues for execution by worker threads in a multi-core system.

BACKGROUND

Current processing systems have multiple processing cores to provide parallel processing of computational tasks, which increases the speed of completing such tasks. For example specialized processing chips such as graphic processing units (GPU) have been employed to perform complex operations such as rendering graphics. A GPU is understood as a specialized processing circuit designed to rapidly manipulate and alter memory to accelerate the creation of images in a frame buffer intended for output to a display. GPUs may include hundreds if not thousands of processing cores since graphic processing may be massively parallelized to speed rendering of graphics in real-time. GPUs perform various graphic processing functions by performing calculations related to 3D graphics. These include accelerating memory-intensive work such as texture mapping and rendering polygons, performing geometric calculations such as the rotation and translation of vertices into different coordinate systems. GPUs may also support programmable shaders, which can manipulate vertices and textures, oversampling and interpolation techniques to reduce aliasing, and very high-precision color spaces.

In multi-core systems, it is desirable to perform multi-threading in order to accomplish parallel processing of programs. Multi-threading is a widespread programming and execution model that allows multiple software threads to exist within the context of a single process. These software threads share the resources of the multi-core system, but are able to execute independently. Multi-threading can also be applied to a single process to enable parallel execution on a multi-core system. This advantage of a multi-threaded program allows it to operate faster on computer systems that have multiple CPUs, CPUs with multiple cores, or across a cluster of machines because the threads of the program naturally lend themselves to concurrent execution.

A task scheduler is a program or a module of a program that is responsible for accepting, ordering, and scheduling portions of the program to be executed on one or more threads that are executed by the cores in a multi-core system. These portions of a program are typically referred to as tasks. In any multi-thread capable system, scheduling and executing tasks requires synchronization. This synchronization introduces a serial point that effectively renders a multi-thread system singular and the subsequent effect on performance is explained with Amdahl's law. Amdahl's law states that if P is the proportion of a program that can be made parallel (i.e., benefit from parallelization), and (1−P) is the proportion that cannot be parallelized (remains serial), then the maximum speedup that can be achieved by using N processors is $S(N)=1/(1-P)+P/N$.

Presently, there are three synchronization mechanisms employed by computer programs to address ordering or serialization issues that arise when using multiple threads to parallelize program execution. The least expensive is atomic instructions or operations, which is the least costly in regard for the number of CPU cycles required to synchronize an operation. The second and next expensive mechanism is typically referred to as "lockless," in which one or more atomic instructions are used to synchronize data and program operation. The third are mutual exclusion (Mutexes), critical sections, and locks. These mechanisms are typically used to guard a region of a program from multiple simultaneous access from multiple threads. Not only are these mechanisms the most expensive, they tend to suffer an additional issue in which if a user or thread is pre-empted in its execution while it owns the lock, it can serialize a program for a significant amount of time.

In addition to the cost of the serialization mechanism another factor must also be considered, namely, simultaneous accesses to that specific mechanism. This is typically referred to as "contention" and is directly related to the number of users, tasks, or threads attempting to synchronize the same portion of a program. Contention issues reduce the speed of execution because cores must wait for the completion of other tasks by other cores.

Therefore, to maximize the potential of a multi-thread system to run a program in parallel, the serial tasks managed by a task scheduler must be minimized. In smaller scale multi-thread systems, concurrent execution is relatively simple. For example, a program with 500-1000 tasks on four worker threads (e.g., one thread for graphics, one thread for artificial intelligence, etc.) will not encounter serious contention issues. However, as the number of tasks increases from more complex issues and the number of cores increases (e.g., 20,000 tasks on eight cores or more with hyper-threading), contention is a major issue in maximizing the parallel execution of the program.

The number of CPU cycles required to be executed during the synchronization is also a consideration. In the case of atomic operations, the CPU can only serialize a small amount of data (typically 4 to 8 bytes) in which the cost may only be the number of CPU cycles require to execute the instruction in addition to the number of cycles required to propagate the data change. However in the case of Mutexes and critical sections, not only is the atomic penalty incurred (since they are implemented using atomics), but in addition they are commonly used to perform much more complex work that cannot be expressed with a singular instruction.

This additional complexity of work will incur many more CPU cycles, which in turn will increase the cost of the synchronization.

In this way, the overall cost of synchronization or the amount of serial execution can be described or computed as "TotalCost=Synchronization Mechanism Cost*CPU Cycles*Amount of Contention." To reduce serialization to a minimum it is therefore required to consider and reduce the total cost of synchronization.

Thus, there is a need for a task scheduler that minimizes the amount of serial execution of program tasks in assigning threads to cores for parallel execution in a multi-core system. There is also a need for a task scheduler that organizes tasks in task groups and task group queues, which are in turn organized in a hierarchy for assignment to worker threads. There is a further need for a task scheduler that efficiently uses workers to perform tasks in parallel while minimizing locks. There is also a need for a task scheduler that minimizes the amount of contention a multi-core system incurs when multiple worker threads are attempting to acquire the same lock.

SUMMARY

According to one example, a task scheduler for scheduling a plurality of tasks of a program to be executed on one or more worker threads is disclosed. The task scheduler includes a task group component that creates task groups by assigning each of the plurality of tasks to a task group. A task group queue component organizes the task groups according to a predetermined criterion in a task group queue and creates a hierarchy of task group queues. A worker thread pool includes a group of worker threads each associated with one of a plurality of processor cores. A scheduler logic component assigns the worker threads in the worker thread pool to execute the task group queues according to the hierarchy of task group queues.

Another example is a method for scheduling tasks in a multi-core system. A plurality of tasks, each having an assigned priority, is grouped by priority in a task group. The task group is assembled with other task groups having identical priorities in a task group queue. A hierarchy of task group queues is established based on priority levels of the assigned tasks. Task groups are assigned to one of a plurality of worker threads based on the hierarchy of task group queues. Each of the worker threads is associated with a processor core in the multi-core system. The tasks of the task groups are executed via the worker threads according to the order in the hierarchy.

Another example is a non-transitory, machine readable medium having stored thereon instructions for scheduling tasks for execution by a plurality of processor cores. The stored instructions comprise machine executable code, which, when executed by at least one machine processor, causes the machine processor to group a plurality of tasks, each having an assigned priority, by priority in a task group. The instructions cause the machine processor to assemble the task group with other task groups having identical priorities in a task group queue. The instructions cause the machine processor to establish a hierarchy of task group queues based on priority levels of the assigned tasks. Task groups are assigned to one of a plurality of worker threads based on the hierarchy of task group queues. Each of the worker threads is associated with a processor core of the plurality of processor cores. The instructions cause the machine processor to execute the tasks of the task groups via the worker threads according to the order in the hierarchy.

Additional aspects of the invention will be apparent to those of ordinary skill in the art in view of the detailed description of various embodiments, which is made with reference to the drawings, a brief description of which is provided below.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Figure 1:
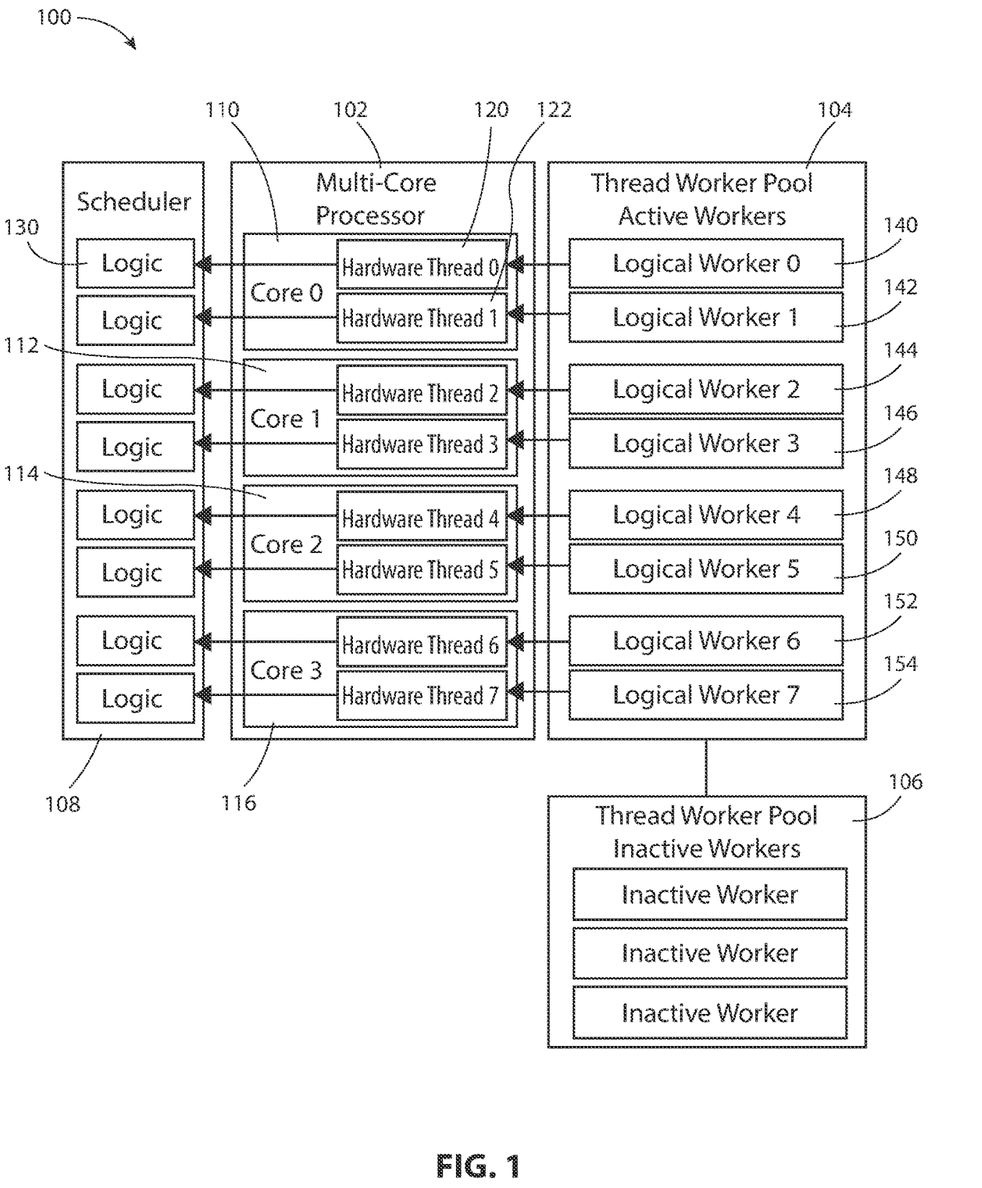
FIG. 1 is a block diagram of a multi-core system that includes a task scheduler and a pool of active worker threads.

FIG. 1 shows a multi-core processing system 100 that includes a multi-core processor 102, an active worker thread pool 104, an inactive worker thread pool 106, and a task scheduler 108. The multi-core processor 102 may be any device that includes multiple processing cores such as a multi-core CPU, GPU, and APU.

The multi-core processor 102 executes a program by distributing the tasks in the program among worker threads from the worker thread pool 104. The programs executed by the multi-core processor 102 are segmented into tasks with different priorities for each task that are assigned by a programmer. The task scheduler 108 reduces serialization of a program and minimizes total processing cost, when scheduling and executing tasks in a program executed by the multi-core processor 102 as will be explained below. The task scheduler 108 provides a hierarchy of task group queues where task groups are organized according to a predetermined criterion such as priority. The task groups are a collection of tasks from the program and are grouped into task groups. The task group queues allow for ordered access to task groups that have been submitted for execution. The task scheduler 108 manages worker threads in the worker thread pool 104 that are scheduled to execute tasks. The task scheduler 108 is responsible for the state of the worker threads and the logic associated with assignment of the worker threads to task queues, task groups, and tasks.

In this example, the multi-core processor 102 includes processing cores 110, 112, 114, and 116. The processing cores 110, 112, 114, and 116 in this example each are hyper-threaded and therefore each of the cores 110, 112, 114, and 116 may include multiple hardware threads. This allows each of the cores 110, 112, 114, and 116 to run multiple software threads simultaneously. In this example, two hardware threads such as hardware threads 120 and 122 are assigned to each of the processing cores 110, 112, 114, and 116. It is to be understood that processing cores of more than two threads may be used or processing cores with a single thread. It is also to be understood that the multi-core systems may include many more cores than the four cores 110, 112, 114, and 116 shown in FIG. 1.

As explained above, the task scheduler 108 schedules a plurality of tasks of a program to be executed on one or more worker threads that are each associated with a core of the multi-core processor 102. The task scheduler 108 includes a task group component that creates task groups by assigning each of the plurality of tasks to a task group. The task scheduler also includes a task group queue component that organizes the task groups according to a predetermined criterion in a task group queue and creates a hierarchy of task group queues. The task scheduler 108 includes scheduler logic 130 that organizes tasks that are assigned to each logical worker thread in the worker thread pool 104 and the corresponding hardware thread in a processing core of the multi-core processor 102. As will be explained below, the task scheduler 108 orders the tasks in a hierarchy of task group queues for execution by the cores of the multi-core processor 102. In this example, the active worker pool 104 includes logical worker threads 140, 142, 144, 146, 148, 150, 152, and 154. Each of the logical worker threads 140, 142, 144, 146, 148, 150, 152, and 154 are assigned to one of the hardware threads of the processing cores 110, 112, 114, and 116. As will be explained below, the scheduler logic 130 assigns tasks to each of the worker threads 140, 142, 144, 146, 148, 150, 152, and 154, which in combination, may execute the tasks of a program in parallel on the corresponding processor cores 110, 112, 114, and 116. The inactive worker pool 106 includes worker threads that do not have a corresponding hardware thread assigned from the hardware cores and are therefore inactive. When an active worker thread is finished or idle, worker threads from the inactive worker pool may be activated and assigned to a hardware thread. In this case, the active worker thread associated with the hardware thread may be deactivated and the now activated worker thread would be assigned to the inactive worker pool 106.

In this example, the task scheduler software 108 is run on one of the processor cores 110, 112, 114, or 116 to manage the execution of a program by the multi-core processor 102. However, the task scheduler 108 and corresponding hierarchy of tasks may run on a separate processor such as a CPU or an ASIC. The task scheduler instruction set may also be transferred from one core to another of the multi-core processor 102. The scheduler logic 130 of the task scheduler 108 typically is employed by the worker threads to determine tasks to execute. Once worker threads in the worker pool 104 complete an assigned task, the worker thread will execute the scheduler logic 130 to determine the next task to be executed as will be explained in detail below.

Figure 2:
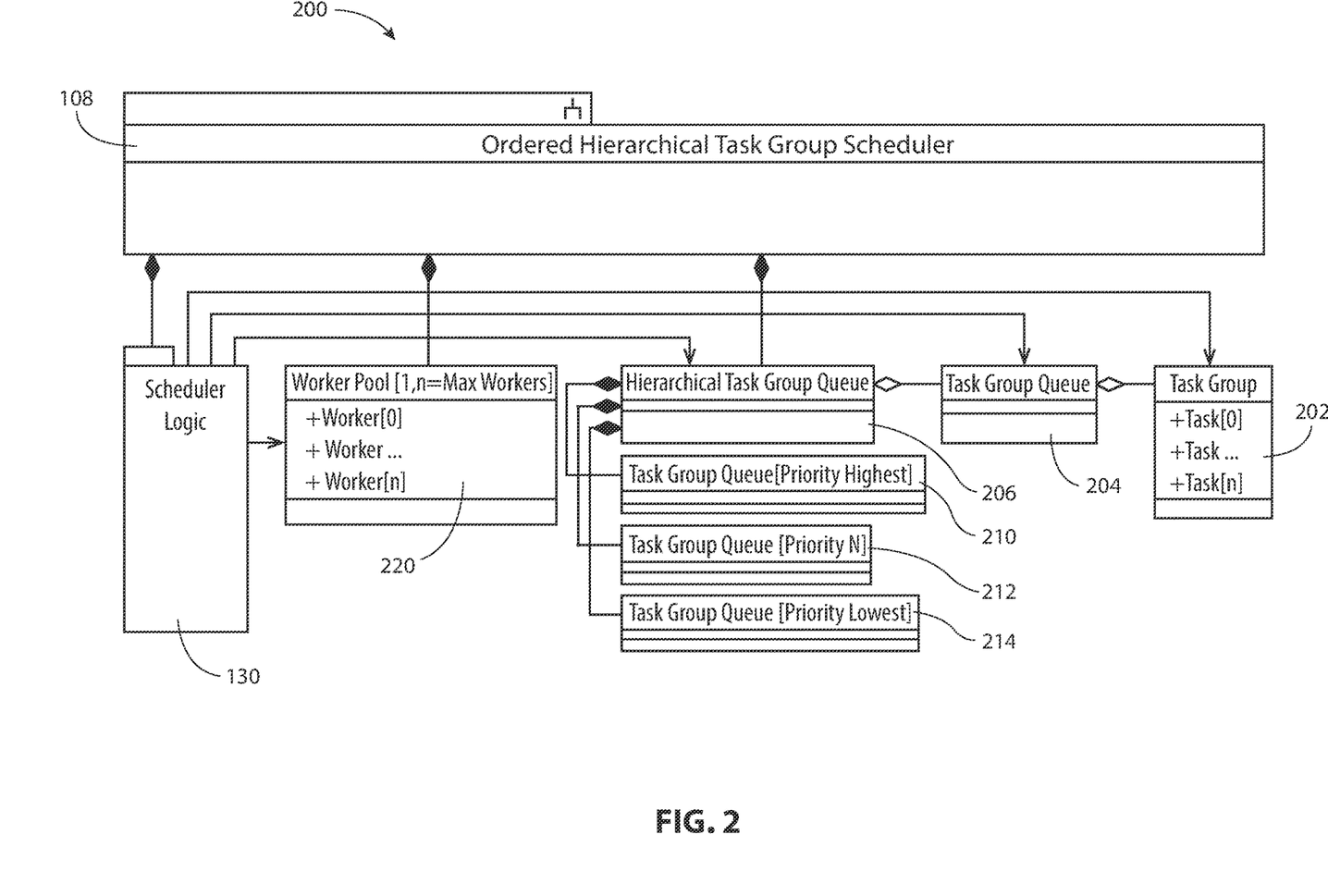
FIG. 2 is a diagram showing the process of ordering tasks in task groups and ordering task groups in task group queues.

FIG. 2 shows a flow diagram of the process or ordering tasks in task groups and ordering task groups in task group queues by the task scheduler 108. An example task scheduling process 200 is performed by the task scheduler 108. The task scheduling process 200 includes a series of task groups 202, which are organized into different task group queues 204 by a predetermined criteria such as priority level. In this example, the task group queues 204 are organized into a hierarchical task group queue 206, which organizes the task group queues 204 into different priority task group queues 210, 212, and 214. In this example the priority queue 210 is the highest priority task group queue and the priority queue 214 is the lowest priority task group queue. The task group queues 204 are all grouped into the priority queues 210, 212, or 214 according to priority of a task group. Although there are three levels of priority in this example, it is to be understood that any number of priority levels may be used to organize the task group queues 204. The task scheduler process accesses a worker pool 220, which includes the available worker threads from the available worker pool 104 in FIG. 1. The task scheduler 108 also includes the scheduler logic 130, which is used to organize the order of the tasks for performance by worker threads in the worker pool 220.

The hierarchy 206 of task group queues organizes task group queues such as the task group queue 204 according to priority. The use of task group queues 204 allows for ordered access to task groups that have been submitted by the user for execution. The task groups, such as the task group 202, each are a collection of tasks to be executed. The software thread pool or worker thread pool 220 is a group of software threads that exist and may be scheduled to execute tasks. The task scheduler 108 is responsible for managing the state of the software or worker threads and the scheduler logic 130 is associated with assignment of worker threads to the task queues, task groups, and tasks within the task groups.

These components are utilized together to generate a framework in which a hierarchy of synchronization may be expressed in which serialization is minimized and ordering of work can be maintained for a multi-core system such as the system 100 in FIG. 1. This hierarchy allows utilization of a layered approach to synchronization in which mechanisms with a much lower cost and complexity may be applied to multi-core systems such as the multi-core processor 102 in FIG. 1 to allow parallel processing. For example, atomic add (Atomic_Add), atomic increment (Atomic_Increment), atomic exchange add (Atomic_Exchange), and atomic compare and exchange (Atomic_CompareAndExchange) instructions may all be used to coordinate the acquiring of a task without requiring "locking." These mechanisms may be considered lockless synchronization primitives. An example for a linked list of tasks within a task group is the following:

```
    }
    pNextTask = ATOMIC_EXCHANGE(pTaskGroupHead);
    if(pNextTask = END_VALUE)
    ExitGroup( );
}
```

In addition, even if a "lock" technique was used, acquiring a task within a specific group is the only critical consideration and since the scope of work is much smaller, the lock needs to be held for fewer processor execution cycles, which results in less opportunity for contention.

The task group 202 is the lowest level component used within the scheduling hierarchy produced by the process 200 and is designed to allow the user to associate a set of tasks from 1–n from the program with the task group, which may then be executed by the worker threads. Users may also specify the maximum number of worker threads allowed to execute tasks within the task group. By altering both the number of tasks in the task group, as well as the maximum number of worker threads, the user is able to configure a task group which will have minimal contention.

For example, the expected execution time for a simple task, "AddValueToField( )" may be very small such as 50 cycles. The performance of the task by a worker thread through an "AcquireTask( )" command, even if lockless, may be 100 cycles. Therefore the likelihood of contention being an issue is super linear with regards to the number of worker threads in the task group, as the worker threads in this group will spend more time acquiring tasks then executing them. So in this case, instead of having eight worker threads in one task group, it will be more efficient to have one worker thread assigned to eight task groups. The inverse is also true, in that if the task "AddValueToField( )" takes several thousand cycles, then the likelihood of contention drops dramatically and it will be more efficient to have eight worker threads in one task group.

In addition, each worker thread has two unique IDs that may be used by the tasks. The first ID is an Application ID and is guaranteed unique for each worker thread in the application. The second is the TaskGroupID and is guaranteed unique to each worker within a specific task group. In this way the user can use either the TaskGroupID, or the ApplicationID as a key to separating the workload of the task groups. Also the task group itself can be referenced to add more context to the task, which allows for even finer grained sequence control.

Contention refers to multiple threads trying to access the same resources, not just locks and synchronization mechanisms. An example of contention is if a user has values they would like to sum in the following code.

```
SumTask( )
{
ValueToAdd = GetValue( );
ATOMIC_ADD(&SharedSum, ValueToAdd);
}
```

With a task designed like this example, the more worker threads executing tasks, the more contention will result from executing the instruction "&SharedSum," which adds the sum, as only one hardware thread can write to it at a time. This would be a case of high contention. The example scheduler 108 resolves this problem by the following instructions.

```
Sum Task( )
{
LocalWorkerSumRef = GetLocalWorkerSum(TaskGroupID);
ValueToAdd = Get Value( );
LocalWorkerSumRef += ValueToAdd;
}
```

The task scheduler 108 works with two identifiers associated with tasks, TaskGroupID and Application ID. Either the TaskGroupID or ApplicationID identifiers, or both, may be used as keys to allow the separation of data. The TaskGroupID identifier is unique to the task group, whereas the ApplicationID identifier is unique to the application. Since the number of workers in a task group may be limited, there are fewer TaskGroupIDs to handle and therefore the user may have finer grained control over how they use the key to reference specific data or use regions of program memory. If the user were to use just the ApplicationID of the worker thread, the user would need to handle a greater range of values, which may be less optimal or convenient for them. This is especially true as the number of possible worker threads increases. Hence the TaskGroupID better constrains the problem for the user.

Users may also specify a signal function that will be called once all tasks have been completed within a group by the last remaining worker thread. This allows for re-entrant task groups, as well as the dynamic building and execution of task group graphs. The signal function is a way for the user to specify specific code to be executed once all tasks in a task group have completed. The signal function is only run once per completion of all tasks in the task group. An example of a signal function is shown in the following pseudo-code:

```
SimpleSignalFunction( )
{
bSumValuesTaskGroupComplete=true;
}
```

Then somewhere else in the application,

```
While(!bSumValuesTaskGroupComplete)
{
DoSomethingElse( );
}
```

In this example, the value "bSumValuesTaskGroupComplete" assigned by the user is shared and therefore the scheduler 108 alerts the user when the tasks are complete. Another example is where the user may set up the task group to be re-entrant or cyclical as shown below.

```
ReEntrantSignalFunction( )
{
AddTaskGroup(ThisTaskGroup);
}
```

The user may also dynamically build a graph or tree of task groups. For task groups A, B and C in the below example, when task group A is complete, the completion signal "SignalA( )" is sent and task group B is added. When task group B, the completion signal "SignalB( )" is sent and task group C is added.

```
SignalA( )
{
AddTaskGroup(TaskGroupB);
}
SignalB( )
{
AddTaskGroup(TaskGroupC);
}
SignalC( )
{
BtaskGroupABCComplete = true;
}
Or with TaskGroup A,B,C
{
bTaskGroupAComplete=False;
bTaskGroupBComplete=False;
AddTaskGroup(TaskGroupA);
AddTaskGroup(TaskGroupB);
}
SignalA()
{
bTaskGroupAComplete = True;
if(bTaskGroupBComplete)
AddTaskGroup(TaskGroupC);
}
SignalB( )
{
```

```
BtaskGroupBComplete = True;
if(bTaskGroupAComplete)
    AddTaskGroup(TaskGroupC);
}
```

In this way task group C may be dynamically added once task groups A and B are both completed. Dependencies like this are representative of simple graphs of execution, but more elaborate ones may be constructed.

Due to the ability of task groups to reside in prioritized task group queues that can have stricter ordering rules, the amount of data required to be synchronized between worker threads executing within the task group is minimized. This minimization allows for a much less costly synchronization mechanism to be employed to ensure proper ordering of tasks within the task group. In addition, by aggregating a series of tasks within a group, an additional level or ordering or priority can be considered by the task scheduler 108.

The below is an example of pseudo code for a user (programmer) to populate a task group and add the task group to the task scheduler 108 in FIG. 2.

```
Scheduler::TaskGroup userTaskGroup;
userTaskGroup.AddTask(UserTaskA, TaskPriorityA);
userTaskGroup.AddTask(UserTaskB, TaskPriorityB);
userTaskGroup.AddTask(UserTaskC, TaskPriorityC);
if(user.TaskGroupDesiresSignal( )
    userTaskGroup.AddSignal(UserTaskSignal);
```

In this example, the user task groups A, B, and C have priority levels (TaskPriority) and tasks are added to each user task group based on the priority levels of the tasks. The task groups in this example include a signal function and thus the user will receive a call back signal to indicate the tasks in the task group are finished executing.

The task group queue 204 is the next level component used within the scheduling hierarchy and is designed to apply another layer of ordering within the hierarchy established by task scheduler 108. The task group queue 204 is responsible for maintaining application state regarding the next level of task ordering and functions as an ordered queue such as a priority heap, FIFO, etc. Task group queues also associate state information that is used to determine which worker threads are allowed access to a particular task group queue. Prioritization of task groups may be determined by any number of user specified factors as may be dictated by the task scheduler 108. For example, in the case of N task group queues, where N is the number of task group queues, the priorities could range from highest to lowest with the N task group queues being assigned to discrete high, medium, and low priority task group queues. To reduce contention between an example four worker threads, all the worker threads may be assigned valid for the highest priority task group queue. Half of the worker threads may be assigned valid for the medium priority task group queue. Only one worker thread may be assigned valid for the lowest priority task group queue. In this way the worker threads distribute themselves to make it less likely any one of them will fight over a particular task group queue. If contention is detected while acquiring a task group queue, a worker thread may move to another associated queue. Instead of different priority levels to arrange the task group queues, other criteria—such as immediate, frame, and background status—may be used for the task group queue breakdown. In this case, tasks having the immediate status could always be checked, tasks having frame status are inspected once per frame, and tasks having background status are inspected once every second.

Figure 3:
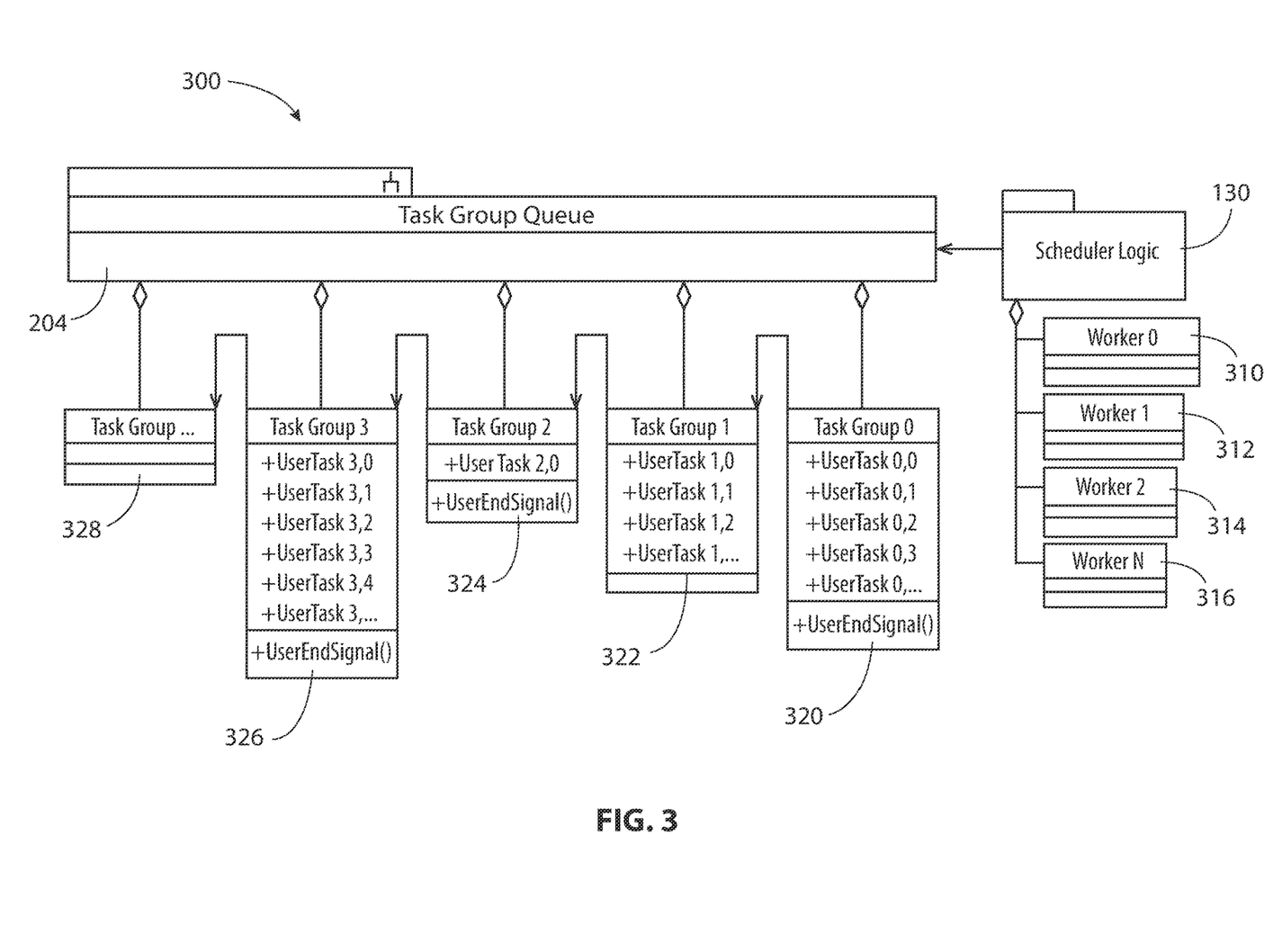
FIG. 3 is a diagram showing the process of ordering task groups within a task group queue for scheduling by the task scheduler logic.

FIG. 3 is an example diagram 300 of a FIFO task group queue such as the task group queue 204 in FIG. 2 where task groups that are placed into a task group queue first are operated on by worker threads first, with task groups added afterwards being operated on by worker threads in order of their addition to the task group queue 204. FIG. 3 shows an example task group queue 204 in FIG. 2 that has organized task groups by first in first out (FIFO). The scheduler logic 130 controls a plurality of worker threads including worker threads 310, 312, 314, and 316. The tasks have been organized into task groups 320, 322, 324, 326, and 328. Each of the task groups such as the task group 320 includes a series of user tasks that are ordered according to the designation in the program written by the user. At the conclusion of the last user task in a task group, such as the task group 320, a user end signal is encountered that allows the task group queue 300 to proceed to the next task group such as the task group 322.

The task group queue hierarchy is the last level of ordering and organization utilized that allows the user and the task scheduler 108 to reduce contention when assigning task group queues to the available worker threads. When a task group is added, its priority level is considered and the task group is then assigned an appropriate task group queue based on that priority. In an application, task groups tend to span more than one priority level, and therefore the priority assignment allows for a reduction in queue contention and therefore total cost. Contention at this level can be considered to be reduced at a maximum by 1/(Number of Total Priorities).

The scheduler logic 130 is aware of these priorities and may appropriately assign worker threads based on the current state of the task group queues, the worker threads, and the scheduler state itself. Priority levels for task group queues need not be fixed. The priority levels may change. For example the priority level could be decreased if the task group queue is idle or empty for a specified period of time. The priority may be increased if a task group with a significant workload is recently added to a task group queue, or a significant number of task groups are added to a specific task group queue, or if the number of outstanding task groups in a task group queue becomes significant, or if the program itself changes state (e.g., from background to foreground or to minimized). Another example is if some application specific state such as "Paused," or "Asset Loading," or "Multi-Player Enabled" in a game application occurs. To that extent, even the number of players in a game might be used to re-prioritize the queues. The priority may be changed based on the current history since it is unlikely that there will be future work, or if a task group queue has not been used, the task group queue could be elevated in priority to service the tasks in the task group queues. Thus, if certain task group queues are underutilized, they may be reprioritized to a higher level so that contention by the worker threads on the task group queues that are currently used is reduced. For example, if task groups are always added to the highest priority task group queue, more contention may occur on that task group queue. If the medium priority task group queue is remapped to the highest priority, then worker threads may be redistributed more evenly between task group queues.

A user does not typically need to interact directly with the task group queues or the task group queue hierarchy as it is automatically performed by the task scheduler 108. Alternatively, a user may reprioritize queues or assign worker threads via a simple API call provided by the task scheduler 108, which allows a user to rearrange the queues for assignment to worker threads. This feature may be used when the user is doing something "unexpected" with the system and the current scheduler logic is conflicting with the user's wishes. It may also be used to augment the logic so that the users may tweak performance/reduce contention when the user is going out of the typical expected bounds of the program.

Figure 4:
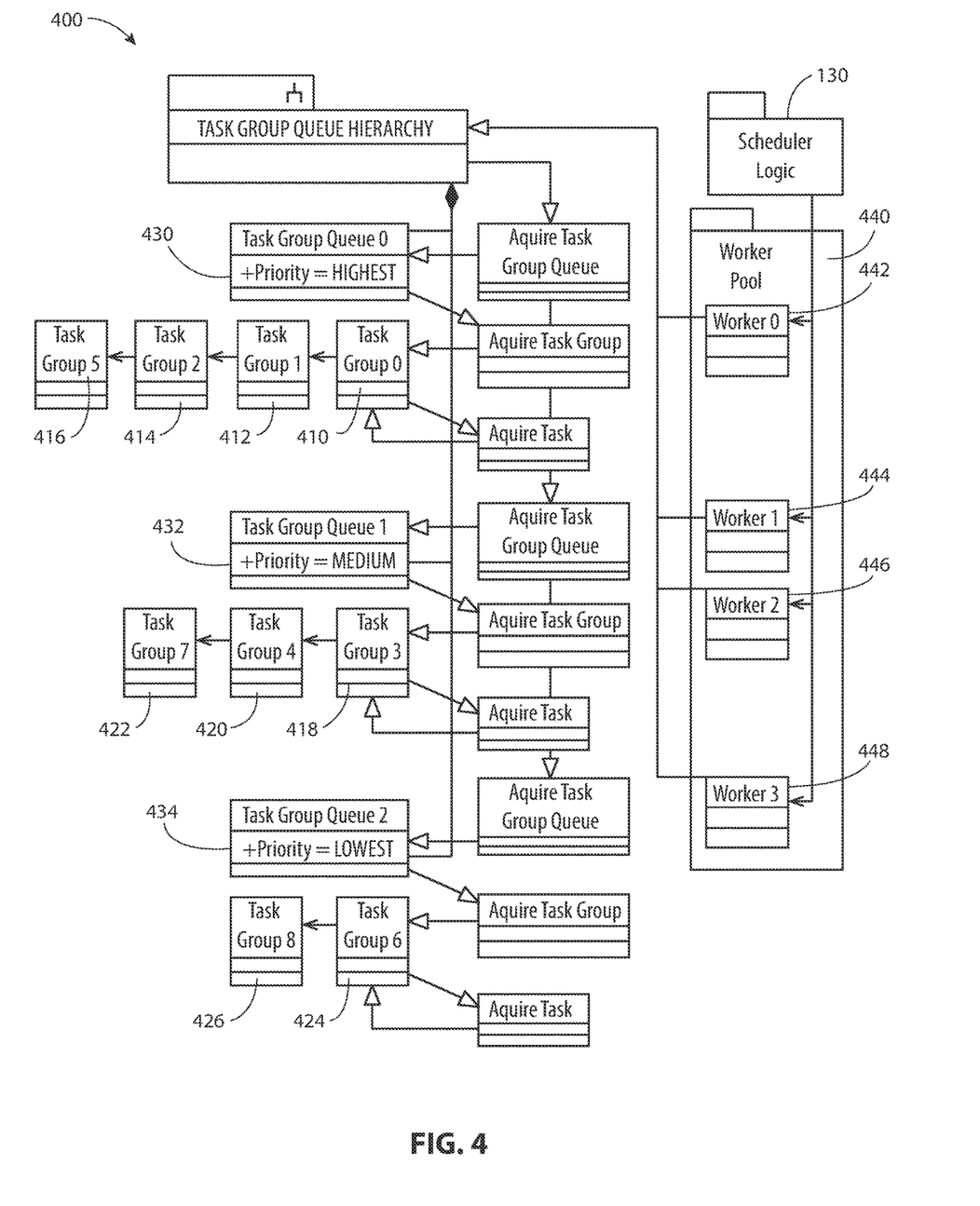
FIG. 4 is a flow diagram showing the sequence of assigning worker threads to tasks in task groups having different priorities in a hierarchy.

FIG. 4 shows an example hierarchy 400 of task group queues in relation to scheduling and assignment to worker threads in a worker pool such as the worker pool 104 in FIG. 1. The hierarchy 400 is used to assign the tasks to one of nine different task groups 410, 412, 414, 416, 418, 420, 422, 424, and 426 in this example. It is to be understood that the hierarchy may include any number of tasks assigned to any number of different task groups. As explained above, the nine different task groups 410, 412, 414, 416, 418, 420, 422, 424, and 426 are prioritized into three levels of priority in this example. Thus a task group queue 430 is assigned the highest priority and assigned task groups 410, 412, 414, and 416. A second task group queue 432 is assigned medium priority and assigned task groups 418, 420, and 422. A third task group queue 434 is assigned low priority and assigned task groups 424 and 426.

The scheduler logic 130 in this example manages a worker pool 440 that includes four worker threads 442, 444, 446, and 448. The task group hierarchy 400 arranges the task groups 410, 412, 414, 416, 418, 420, 422, 424, and 426 in the task group queues 430, 432, and 434. The task group hierarchy 400 then acquires a task group queue that in this example is the highest priority task group queue 430. After the task group queue 430 is acquired, a task group in the task group queue 430 is acquired such as the task group 410. The scheduler logic 130 then assigns an available worker thread from the worker pool 440 to perform the acquired task from the acquired task group. This process continues until all of the task groups in the task group queue 430 have been assigned a worker thread in the worker pool.

After completion of assigning the task groups of the first task group queue 430 to worker threads, the hierarchy 400 of the scheduler 108 then acquires the second task group queue 432. After the task group queue 432 is acquired, a task group in the second task group queue 432 is acquired such as the task group 416. The scheduler 108 then assigns an available worker thread from the worker pool 440 to perform the tasks from the acquired task group. This process continues until all of the task groups in the task group queue 432 have been assigned a worker thread in the worker pool 440. The scheduler 108 may consider factors such as the availability of worker threads, the completion time of previously assigned workers, the priority of the tasks, avoiding contention, size of the queue or number of outstanding task groups in a task group queue, the period or frequency at which task groups are added to task group queues, the application state (e.g., foreground, background, minimized, paused), and status of worker threads (e.g., paused, waiting for signal, etc.) in order to assign the worker threads.

The following is example code for a user adding a task group to the scheduler as a basis for the user task group. To add a task group to be scheduled, a typical user will call an interface function from the scheduler such as using the command "AddTaskGroup( )" In this example the scheduler logic 130 acquires a user task group reading the priority level and the maximum number of worker threads assigned to the task group.

Scheduler::AddTaskGroup(userTaskGroup, UserGroupPriorityLevel, MaximumNumWorkers);

The task scheduler 108 will implement such a function as follows.

```
Scheduler::AddTaskGroup(TaskGroupReference,
TaskGroupPriorityLevel, MaxWorkers)
{
    task GroupQueue =
    SchedulerHierarchy::SynchronziedAcquireQueue
    (TaskGroupPriorityLevel);
        Scheduler::SynchronziedAddToTaskGroupQueue(taskGroupQueue,
        TaskGroupReference,
        MaxWorkers);
    if(WorkerPool. UseWakeSignal( ))
    ::Scheduler::SignalWorkersWorkAdded( );
}
```

The task scheduler 108 thus will signal the worker thread assigned that work has been assigned and activate the worker thread to begin to perform the added task. The number of worker threads is set in order to match the number of hardware threads or to minimize contention.

The worker thread pool or software thread pool 104 is responsible for providing a set of worker threads that map directly or indirectly to the underlying system hardware threads. For example, in FIG. 1, the workers 140-154 in the worker pool 104 are mapped directly to the hardware threads associated with one of the processing cores 110, 112, 114, and 116. These worker threads are coordinated by the scheduler logic 130 and are used to execute the user tasks that have been stored within the task groups in the hierarchy 400 shown in FIG. 4. The number of worker threads need not be fixed and may even vary throughout the execution of the program. Worker threads are typically generated during the initialization of the task scheduler 108 by interacting with system kernel functions such as "CreateThread( )." A worker thread pool is generally populated with one worker thread per logical CPU core or available hardware thread. However the application can choose to restrict the maximum number of working threads to any amount it chooses. This can be necessary if the number of logical CPU cores is more than the application expected, or if additional threads are created outside of the task scheduler 108 and these may contend with the worker threads managed by the task scheduler 108. Additional worker threads may be created that work as "reserve" or alternate worker threads. In the case where a worker thread may need to block or wait on a signal, it can defer execution and allow another worker thread from the pool to take its place executing on the associated core of the CPU. In this way the cores can be constantly executing user code. Additional worker threads may be created as needed instead of all workers being created by the initialization command "(Init( ))," such as the case where one worker thread defers execution and therefore another worker thread may be assigned to the hardware thread until a signal is received that the execution can continue.

Worker threads have an associated program state that is tracked and used to allow for efficient scheduling by the task scheduler 108 for task groups in the hierarchy. This associated state includes signal objects, time worked or work per task group queue, unique worker identifiers, time in worker state, and worker state. For example, the task scheduler 108 may determine scheduling of lower priority task groups for a worker thread currently executing tasks in a higher priority task group based on the time the worker thread completes the current task group.

The scheduler logic 130 is responsible for aggregating state data from the scheduler 108, worker threads and worker pool 104, task group queue hierarchy, the individual task group queues, and the task groups themselves. Using this data, the task scheduler 108 can locate and assign workers to task groups, and the individual tasks themselves.

group has been reached. Therefore, the task scheduler 108 must look for another group of worker threads to execute the additional tasks. Since no more worker threads are allowed in the task group, the task group is removed from the task group queue, and the worker thread looks for another task group to work on.

```
::Worker::SynchronizedAssignToTaskGroup(TaskGroupQueue)
{
nextTaskGroup = TaskGroupQueue::SynchronizedAcquireNextGroup( );
if(!nextTaskGroup)
return 0;
AssignmentCode = ::Worker::AssignToTaskGroup(nextTaskGroup);
if(AssignmentCode == GROUP_FULL)
::Worker::SynchronizedRemoveGroupFromQueue(TaskGroupQueue, nextTaskGroup);
return 0;
else if(AssignmentCode == ASSIGNED)
::Worker::SynchronizedReleaseGroupFromQueue(TaskGroupQueue, nextTaskGroup);
return nextTaskGroup;
}
::Worker::SynchronizedReleaseGroupFromQueue(TaskGroupQueue, nextTaskGroup);
return 0;
}
```

The scheduler logic 130 for an active worker can best be expressed and understood at a high level as follows.

A first section of pseudo code below represents the logic each worker thread runs when it is active and looking for a task group to work on. The code looks at the workload done and will decide which task queue the worker thread will go to next. If worker thread has been running low, it relinquishes work back to the task scheduler 108 for reassignment. Since each worker thread has a state associated with it, the command, "ComputeElapsedWorkload( )," is used to determine if the worker thread should relax, back off, or suspend execution. The command "Suspend( ) time" and type depend on the state associated with the worker thread. The reason for the suspend is so that other worker threads assigned to other applications, or other worker threads within the application, but not associated with the task scheduler 108, are given a chance to run. Allowing them to run at this point gives a chance to avoid a context switch during task group execution, which can stall a worker thread and produce sub-optimal runtimes. Because adding and removing from a task group queue happen on multiple worker threads, serializing access to the task group queue is necessary to maintain order. Based on the current associated state of the worker thread and the state of the task scheduler 108, the command "CalcCurrentQueuePriority( )" determines which task group queue to attempt to synchronize the worker thread acquisition to.

```
Scheduler::Worker::Work(WorkLoadThreshold)
{
While ( Worker::ComputeElapsedWorkload( ) < WorkLoadThreshold)
{
CurrentTaskGroupQueue =
Scheduler::AcquireQueue(Worker::CalcCurrentQueuePriority( ));
CurrentTaskGroup=
::Worker::SynchronizedAssignToTaskGroup(CurrentTaskGroupQueue);
if(CurrentTaskGroup)
::Worker::AcquireAndExecuteTasks(CurrentTaskGroup);
}
Worker::Suspend( );
}
```

A second example of pseudo code below represents a situation if the specified maximum worker threads for a task A third example of pseudo code below represents an indication that the worker thread is finished and is seeking to acquire the next task. The code allows synchronization with other worker threads working on the task group. Since the task group has already been created, the amount of work for performing the tasks is much smaller due to the assigned priority of the created task group than if all the data is aggregated into one large non-hierarchical task group. If no tasks are left then the worker thread signals it is finished. This needs to be synchronized as multiple worker threads may be working on the task group simultaneously yet only one should be allowed to execute the signal function associated with the task group. It also needs to be synchronized since the task group may need to be removed from its task group queue. The "SynchronizedAcquireNextTask( )" command may be implemented purely with atomic instructions that do not require a compare (such as an "ATOMIC_COMPARE_EXCHANGE( )" command). This is very fast for a processor and results in very little contention. The "SynchronizedExitTaskGroup( )" command is more heavyweight as it will need to somehow acquire exclusive access to the queue. At the very least this will require an "ATOMIC_COMPARE_EXCHANGE( )" command or multiple other atomic operations in an ordered fashion. This can be very slow, is prone to contention, and the worker thread has a context switch and will result in a stall. The need for using this command for a heavy weight lock is reduced.

```
::Worker::AcquireAndExecuteTasks(TaskGroup)
{
nextTask = ::SynchronizedAcquireNextTask(TaskGroup);
if(!nextTask)
{
exit_code = ::SynchronizedExitTaskGroup(TaskGroup);
if(exit code == END && TaskGroup::HasEndSignal( ))
::WorkerExecuteSignal(TaskGroup);
return;
}
::WorkerExecuteTask(nextTask);
}
```

The task scheduler 108 therefore determines the worker work load threshold and compares the current task group queue and then determines whether to assign a worker thread to the current tasks in the task group. The task scheduler 108 continues to the next task group and determines whether the tasks have been assigned. If the tasks have been assigned, the worker thread will be assigned tasks from the next task group. The above pseudo code example demonstrates how the task scheduler 108 can reduce the total cost of synchronization. Due to the hierarchy, task groups can be ordered using less costly synchronization primitives than if the entirety was synchronized with locks that only took one level of ordering into account.

The different levels created from assigning different priority levels to different task group queues allows lockless operating of tasks of a certain priority queue. In addition, not all task group queues need to be implemented in the same way. This allows customizing the lock based on the expected usage. For example, a low level queue that only allows one worker thread at a time may maintain a very simple locking mechanism. Also, adding tasks simply involves assigning the task to the appropriate priority level task group preventing the necessity of reorganizing the hierarchy. The task scheduler 108 does not have to go in the same order for every worker thread allowing flexibility in scheduling the worker threads for tasks of different priorities.

Since a lock around each task queue increases serial time for executing programs, the hierarchy allows distribution of locks, which results in less contentious hierarchy of locks. This decreases the amount of time for the lock, and allows synchronization between task groups therefor preventing stalling, which may effectively serialize the program. Distribution also distributes the memory needed to decrease contention, and therefore have only one memory associated with the core. Contention happens when multiple hardware threads or processor cores want to operate on the same piece of program memory. Only one hardware thread can operate on a specific piece of memory at a time. Processors generally do not have a sharing mechanism that orders access fairly. By having each queue maintain a separate lock, the likelihood that two worker threads will try to operate on the same lock is reduced. In this way they are less likely to stall each other and the program will operate faster.

The creation of a hierarchy of tasks provides an efficient method of task scheduling for use in multi-core systems that provide the facility to operate on multiple threads. Using a hierarchy to order the execution of task groups by assignment of workers allows the use of simple locking mechanisms in order to minimize serialization in executing the task groups by the multi-core system.

Figure 5:
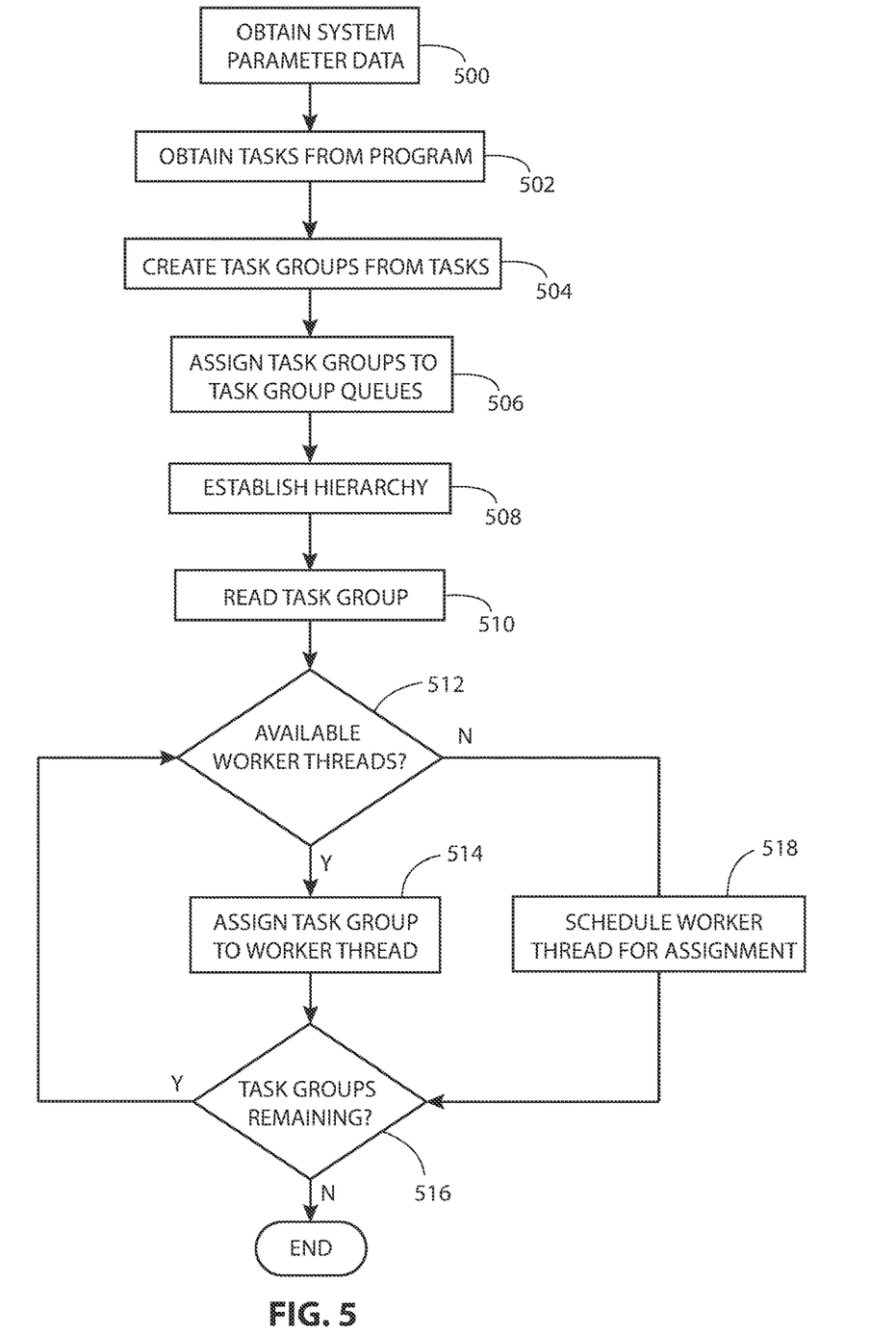
FIG. 5 is a flow diagram of the process used to schedule tasks among multiple threads in the multi-core system in FIG. 1.

The process of scheduling worker threads for tasks may be controlled on the example system 100 will now be described with reference to FIGS. 1-4 in conjunction with the flow diagram shown in FIG. 5. The flow diagram in FIG. 5 is representative of example machine readable instructions for scheduling tasks for worker threads associated with a multi-core system. In this example, the machine readable instructions comprise an algorithm for execution by: (a) a processor, (b) a controller, and/or (c) one or more other suitable processing device(s) such as a GPU. The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces could be implemented by software, hardware, and/or firmware. Also, some or all of the machine readable instructions represented by the flowchart of FIG. 5 may be implemented manually. Further, although the example algorithm is described with reference to the flowcharts illustrated in FIG. 5, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 5 is a flow diagram of process executed by the task scheduler 108 to schedule tasks for a computer program for execution on the multi-core processor 102 in FIG. 1. The task scheduler 108 first obtains the parameters of the system (500) such as the number of active processor cores, the hardware characteristics, the available worker threads, etc. The task scheduler 108 reads the program to be executed and collects the tasks in the program (502). The task scheduler 108 then creates task groups based on the priority of tasks from the program (504). The task groups are then assigned to task group queues, which are ordered by the task scheduler 108 (506). The task group queues are grouped according to priority to establish a hierarchy of task group queues (508).

The task scheduler 108 then begins with the highest priority group of task group queues and determines the priority and the maximum of worker threads to be assigned (510). The task scheduler 108 then determines whether there are available worker threads in the worker pool (512). If there is an idle worker thread, the task scheduler 108 assigns the tasks in the first task group to the worker thread (514). The scheduler 108 then determines whether all worker thread end conditions are met, which indicates no remaining task groups to be assigned (516). If there are remaining task groups indicated by worker thread end conditions not being met, the scheduler returns to determine the priority of the next task group to be assigned (510) and the task scheduler 108 continues to assign task groups to the available worker threads. If there are no remaining task groups, the task scheduler 108 is finished with the scheduling process.

If there are no available worker threads, the task scheduler 108 proceeds to determine the next available worker thread and assigns the worker thread for future execution of the task group (518). The task scheduler 108 continues to assign all of the task group queues in the order of the hierarchy until all the task groups are assigned to a worker thread for execution.

Each of these embodiments and obvious variations thereof is contemplated as falling within the spirit and scope of the claimed invention, which is set forth in the following claims.

What is claimed is:

1. A multi-thread system, comprising:
a first processor core configured to schedule, at a first time, a first plurality of tasks of a first task group to be concurrently executed on a first plurality of worker threads; and
a second processor core configured to acquire a next task of the first plurality of tasks via an atomic exchange function performed on a pointer to a position in the first plurality of tasks, wherein:
the second processor, in response to the completion of a first task by a first worker thread of the first plurality of worker threads, acquires the next task for the first plurality of worker threads;

the first processor core is further configured to schedule, at a second time after the first time, a second plurality of tasks to be concurrently executed on the first plurality of worker threads;

the second processor core is configured to determine, via a result of the atomic exchange function, that the first plurality of tasks is completed;

the second processor core is configured to determine, via a result of the atomic exchange function, that the first task group is completed; and the second processor core is configured to trigger a synchronized exit from the first task group by the first plurality of worker threads.

2. The multi-thread system of claim 1, wherein the atomic exchange function is an atomic increment function.

3. The multi-thread system of claim 1, wherein the atomic exchange function is an atomic add function.

4. The multi-thread system of claim 1, wherein second processor core is configured to, based at least upon the determination that the first task group is completed, send a task group status signal to the first processor core, the task group status indicating that the first task group is completed.

5. The multi-thread system of claim 4, wherein the first processor core is configured, based at least upon the task group status signal, to schedule a second plurality of tasks of a second task group to be concurrently executed on a second plurality of worker threads, the second plurality of worker threads comprising one or more worker threads of the first plurality of worker threads.

* * * * *